United States Patent Office 3,606,643
Patented Sept. 21, 1971

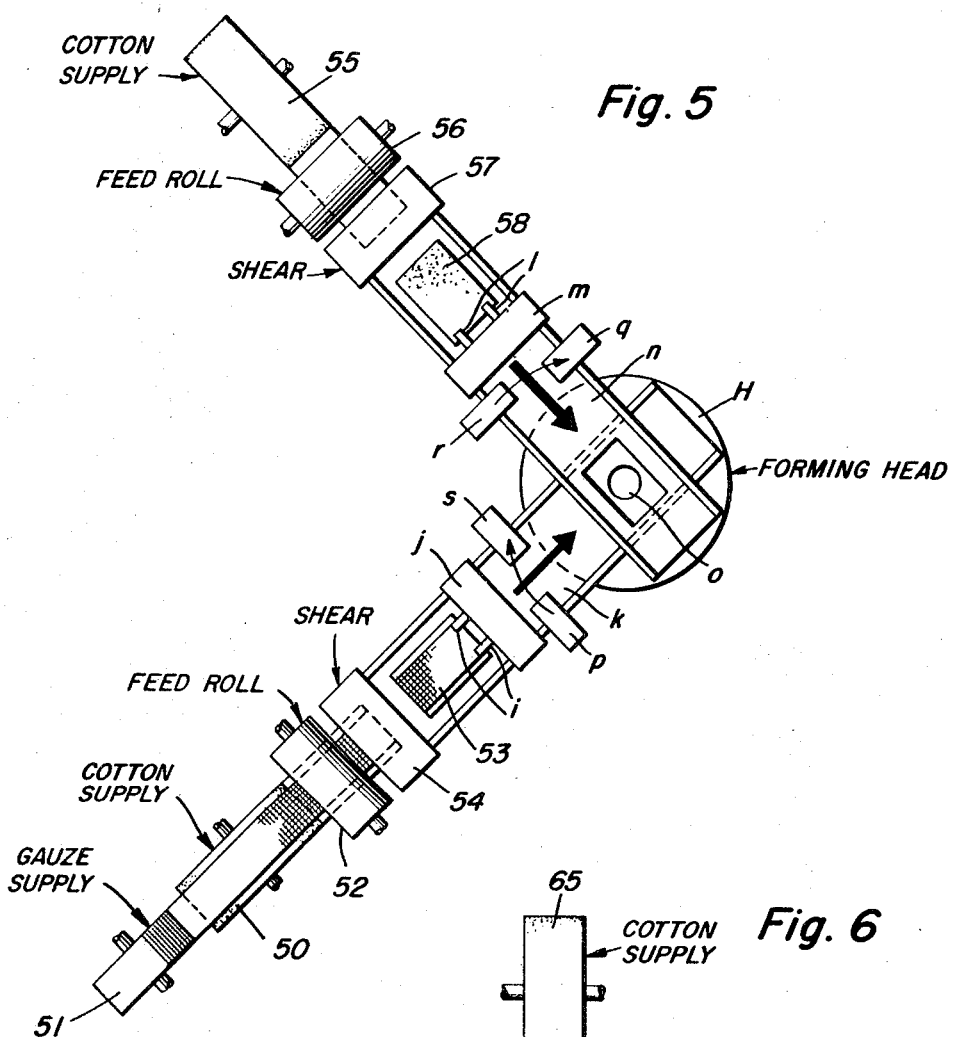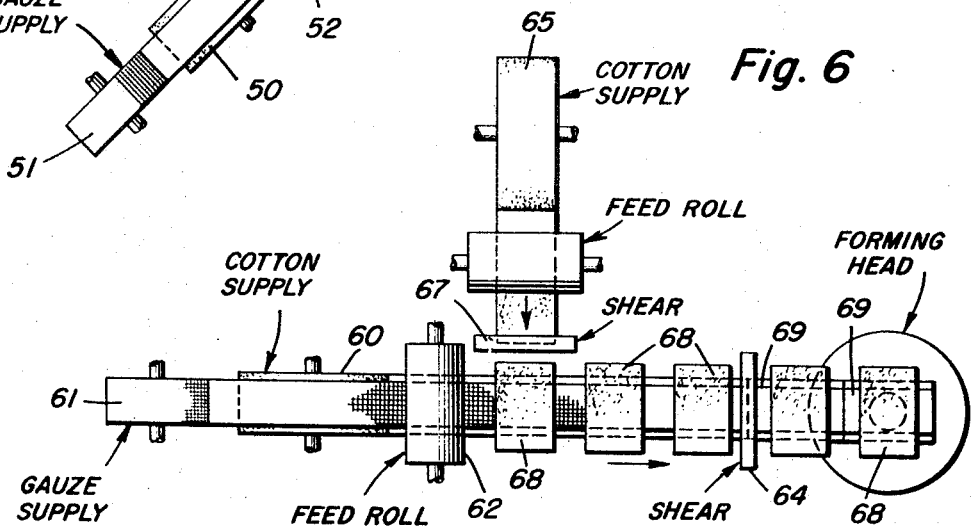

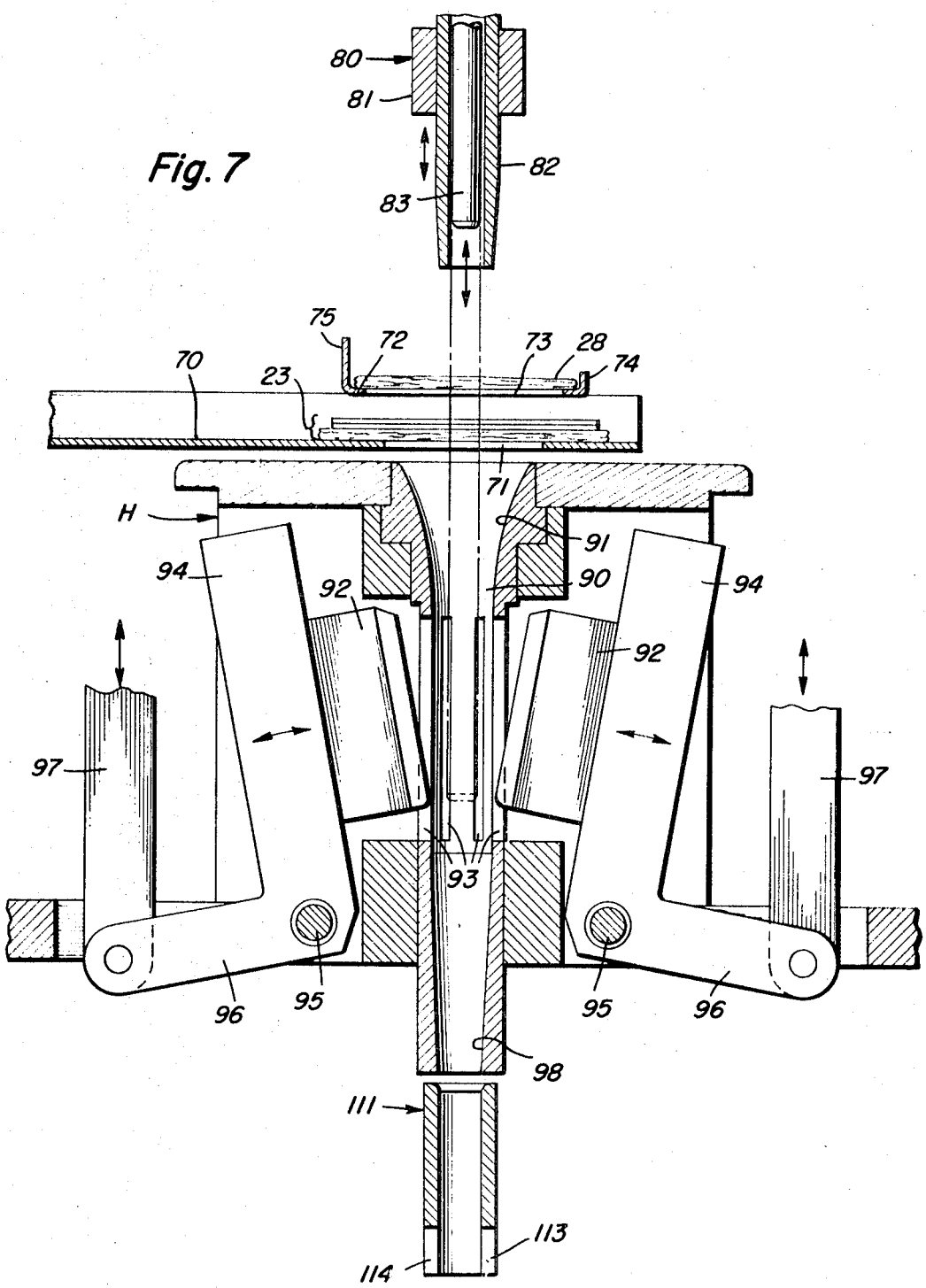

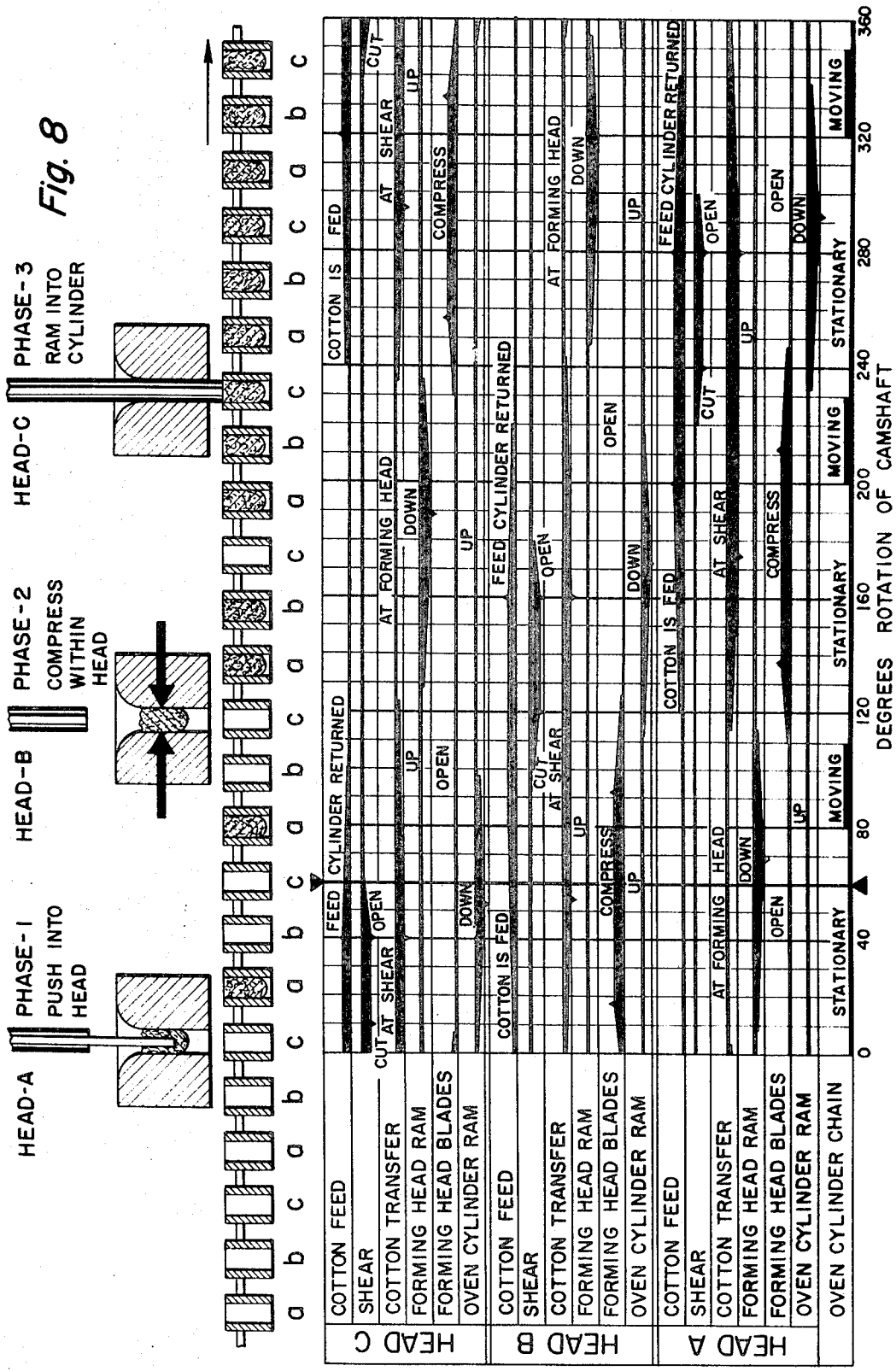

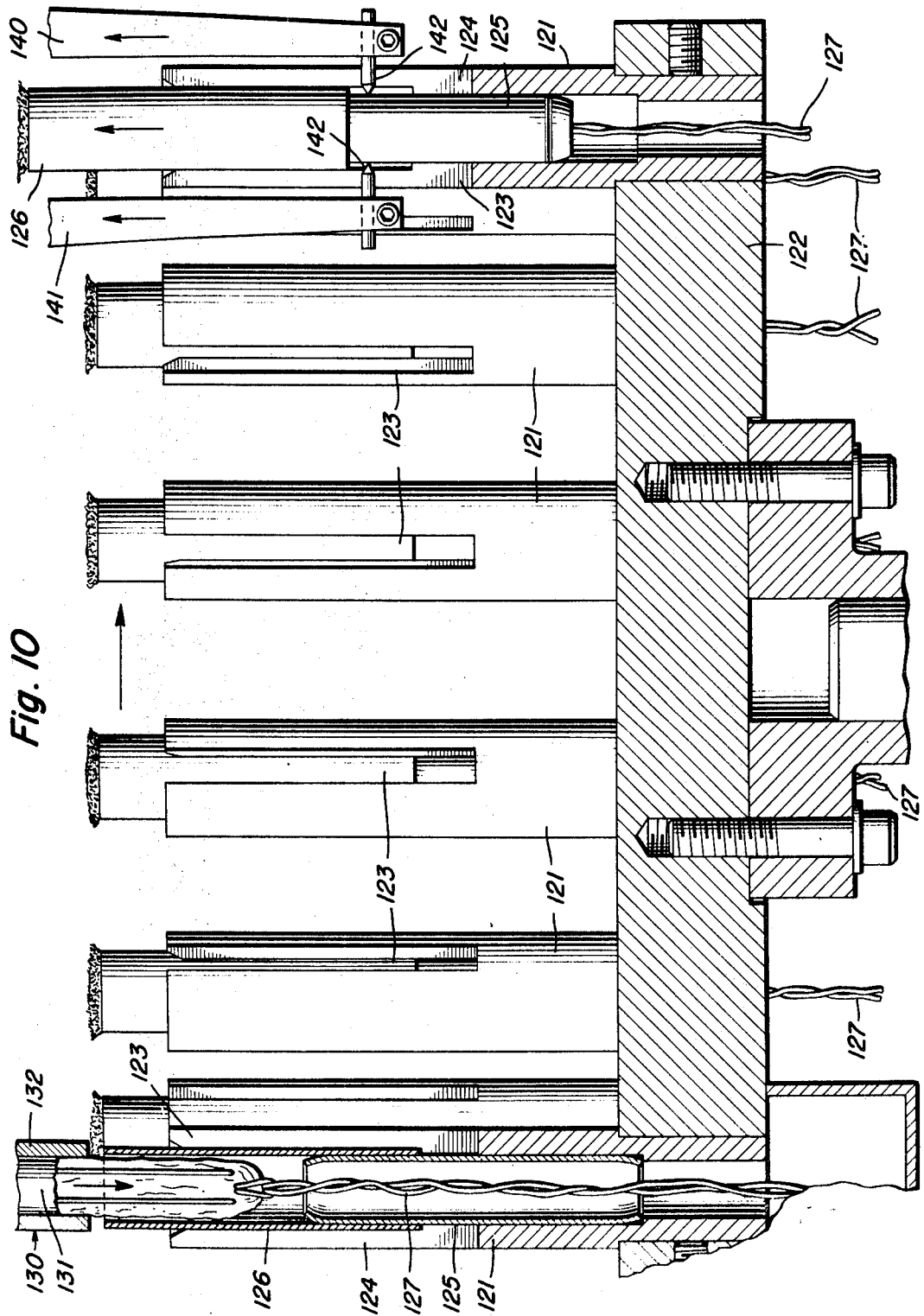

3,606,643
MULTI-PHASE LINEAR FLOW MACHINE FOR MAKING TAMPONS
John Russell Mooney, Fort Worth, Tex., assignor to Mayfield Laboratories, Inc., Fort Worth, Tex.
Original application Jan. 6, 1966, Ser. No. 519,125, now Patent No. 3,465,390, dated Sept. 9, 1969. Divided and this application Aug. 15, 1969, Ser. No. 870,936
Int. Cl. A61l 15/00
U.S. Cl. 19—144.5                                3 Claims

ABSTRACT OF THE DISCLOSURE

In a machine for making tampons, a plurality of tampon forming means, spaced relative to each other for synchronously forming tampons and loading same in an intermittently movable oven cylinder chain, including an assembly wheel for extracting the tampon from the cylinder chain and thereafter discharging the tampon from the machine.

---

This is a division of application Ser. No. 519,125, filed Jan. 6, 1966, now Pat. No. 3,465,390.

This invention is an improved machine for making vaginal tampons, especially tampons encased in tube applicators generally as shown in FIGS. 1 and 2 of expired Rabell Patent 2,425,004 and FIG. 1 of expired McLaughlin Patent 2,353,174.

The use of tampons has gained acceptance in recent years to the point where these products are no longer a novel specialty, but rather are a commercial commodity. The existence on the market of a number of products from competing suppliers has placed new emphasis on the need for production of tampons in the simplest and most economical manner.

The present invention provides a machine to make vaginal tampons in a simpler and more direct way and which eliminates unnecessary operations that tend to slow production and add to cost. The machine has a high production rate and low operating and maintenance expense.

The invention is especially intended and designed for linear feed tampon machines to complement their fast, smooth-flow operation.

A machine of this general type for making tampons may include means for feeding flat pieces of cotton or the like and a piece of gauze, means for superposing one piece of absorbent cotton on another so that they form a cross with the gauze between, means (such as a forming head with associated ram) for folding up or pursing the layers of cotton into a generally cylindrical shape, means for heating the pursed cotton layers while they are held compressed in cylindrical shape, means for applying a withdrawal string to the tampon, and means for assembling the tampon into a pair of telescoping tubes to constitute a finished tampon product. The invention is illustrated as applied to a machine having these means as listed, but it could be applied to variations departing from this list of means.

The basic approach of the present invention is to utilize the principles of direct feed and linear progression of the work, and the invention is particularly adapted to direct feed and linear progression arrangements. A primary feature of the invention is the provision of a single chain of closely spaced cylinders to carry the compressed tampons through a heated oven to give them compression set, with that chain stepping along a linear succession (whose path can be doubled back but continuous) by uniform successive steps, and the provision of a multiplicity of forming heads—each with its own feed—whose associated rams transfer the compressed tampons by pushing them into the cylinders carried by the chain; for any one head this transfer operation occurs at uniform spaced intervals along the chain, once for each three step movements of the chain when there are three (3) heads, once for each $h$ steps when there are $h$ heads, if we let the symbol $h$ represent the number of forming heads. This preferred arrangement gives optimum combination of speed with smooth, quiet, low power operation. The heads are spaced apart by proper distances such that first some of the cylinders are filled, not in succession, and then ones between them are filled, until at the last head all cylinders have been filled in a now continuous succession. What these proper distances for spacing the heads may be will be more precisely defined hereinafter.

The benefits of this invention are realized in full degree only when the feed is also direct and simple. A circuitous feed that is slow and involved does not match with the fast multiphase linear flow arrangement and will hold it back. Use of a simple pat-a-cake, pat-a-cake type feed avoids unnecessary encumberances and allows the linear flow machine's potential for smooth speed to be realized.

The principle of direct feed of two work pieces to a work station, the second work piece being fed at an angle to the first, is far from new and is found in prior patents, for example expired U.S. Pats. 813,733 and 2,010,997. The present machine utilizes this simple, basic feed as part of the linear progression principle and accordingly one aspect of the present invention is adapted specifically to the direct straight-line feed type of machine in which two rectangles of cotton are fed on perpendicular intersecting paths to the point of intersection where one piece is dropped or pushed onto the other. In this type of machine no circuitous intermediate operations are required and the operation is susceptible of being readily speeded up while retaining smooth flow operation. Accordingly, an object of this invention is to provide a machine with a plurality of forming heads and cooperating rams which are in fixed positions so they may be most solidly mounted, and which are in a straight line with each other along the oven chain in order to make use of the linear flow principle. Feed of the rectangular cotton pieces direct to the forming head on two paths at an angle to each other is used for each of these forming head positions. Since the cottom pairs are fed in with the feed of each pair being independent of the others, as many forming heads with associated feed paths can be provided as desired and each ram and forming head assembly can be phased in desired relation with the others. In the form of the invention illustrated there are shown three feed pairs and three ram and forming head assemblies. These are phased to cycle at uniform differences. Thus if each full cycle of operation of all three ram and head assemblies be considered as 360°, each ram and head assembly starts its operation 120° after the previous one started. This gives a smooth steady operation with less noise, vibration and susceptibility to breakdown.

The invention comprises the features of construction and combination of elements disclosed in the following description and drawings which are illustrative and not limitative of the invention.

In the drawings:
FIG. 1 is a top plan diagrammatic view of a machine according to the invention.
FIG. 2 is a diagrammatic side elevation of the machine of FIG. 1.
FIG. 3 is a diagrammatic plan view of a first direct feed arrangement that can be used.
FIG. 4 is a diagrammatic plan view of a second direct feed arrangement that can be used.

FIG. 5 is a diagrammatic side elevation of a third direct feed arrangement that can be used.

FIG. 6 is a diagrammatic side elevation of a fourth direct feed arrangement that can be used.

FIG. 7 is a cross-section of one forming head, showing telescopic ram, work feed station, forming chamber, compression blades, and below it a cylinder on the oven chain.

FIG. 8 is a timing chart, showing the phase relationships of various actuating parts of the machine.

FIG. 10 is a vertical cross-sectional view along the line 10—10 of FIG. 9.

GENERAL DESCRIPTION

Figure 1:
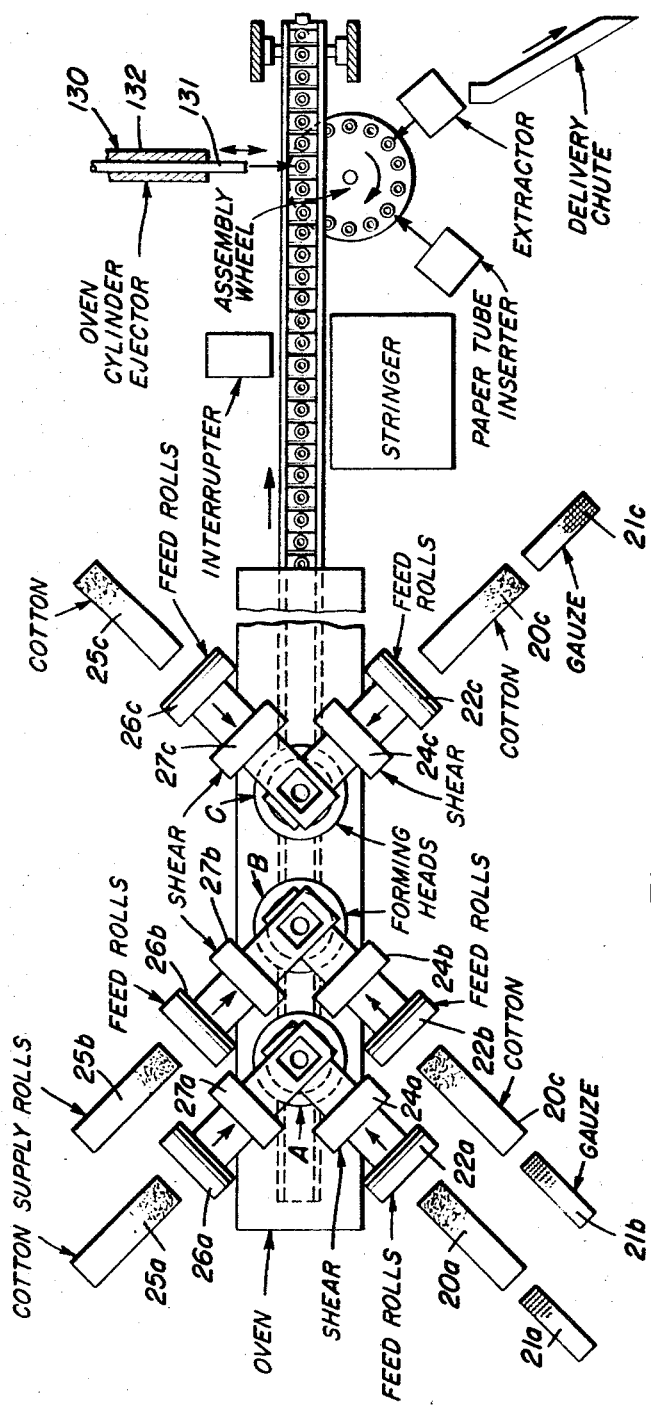
Figure 2:
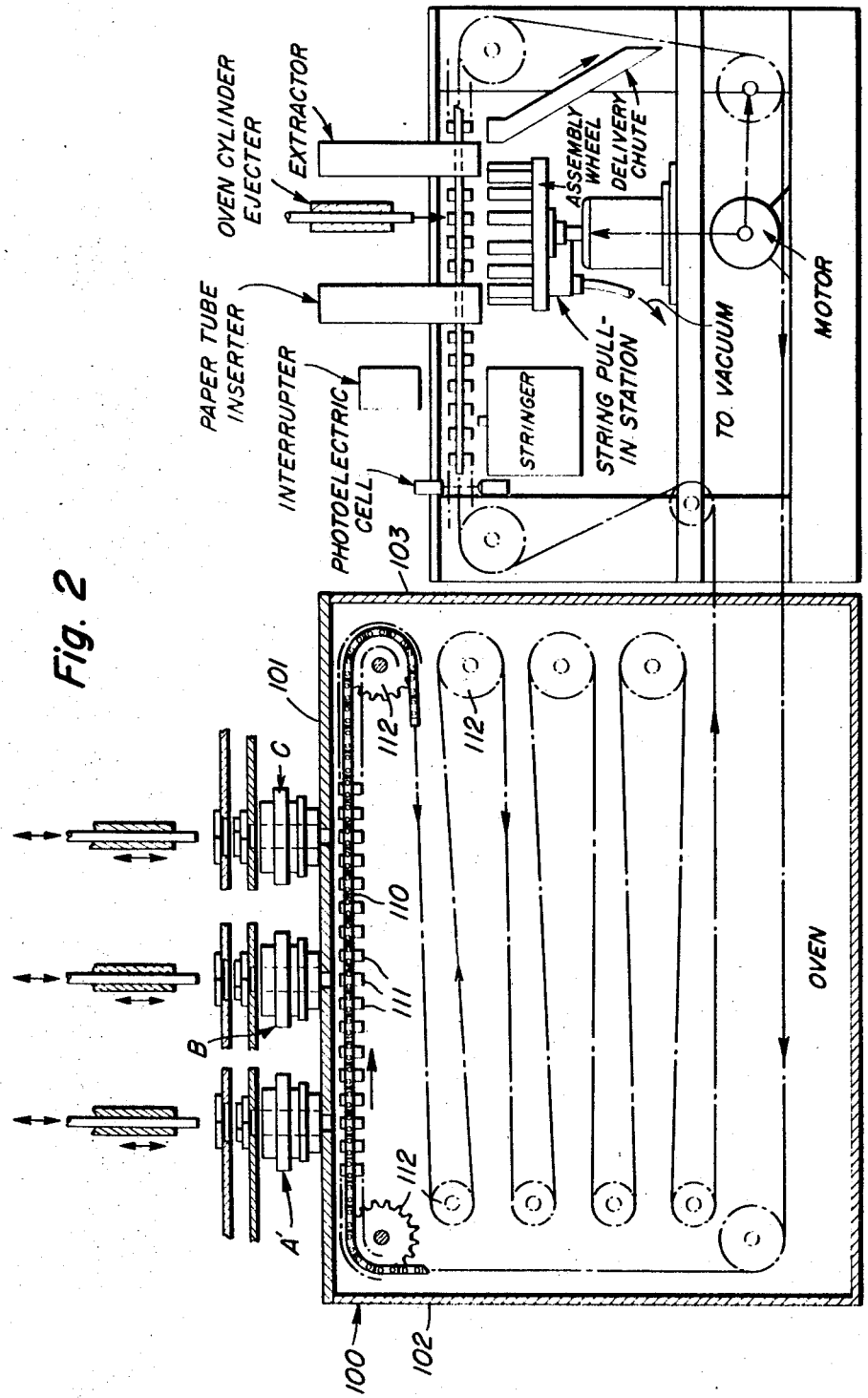

The general arrangement of the machine is best understood with reference to FIGS. 1 and 2. There are seen pairs of feeds, arranged in right angle V's. At the intersection of each pair of feed paths there is a forming head. The third pair of feed paths has been reversed to make the middle forming heads more accessible. Below the forming heads is an oven, and a chain which carries a succession of hollow cylinders travels in it, doubling back and forth, and then out to further work stations. One work station is a stringer, where the withdrawal strings are fastened into the tampons. Toward the end of the machine an assembly wheel is provided. Paper tubes are fed into it, these are brought into registry with cylinders of the oven chain, and the tampons are transferred from the cylinders to the tubes.

DETAILED DESCRIPTION

The supply rolls seen in plan in FIG. 1 appear in side elevation generally like those seen in FIGS. 5 and 6.

Feeding the first forming head A there is at one side a supply roll of cotton 20a and a supply roll of gauze 21a. The cotton and gauze webs are intermittently fed forward together, with the gauze web lying on the cotton web, by intermittently operated feed rolls 22a. Intermittently, their end lengths are sheared off by shears 24a, and the cut lengths are fed by any convenient means to the central area of forming head A, as indicated by the arrows in FIG. 1. From the other side, at 90° to the first supply feed path, another roll of cotton 25a has its web fed by feed rolls 26a through shear 27a and its cut end lengths are fed by any convenient means on to lie across and on top of the first length, that were cut from cotton roll 20a and gauze roll 21a.

Similar parts, similarly numbered, are provided for forming heads B and C.

In order to have the crossed cut end lengths of the webs come to lie one upon the other and centered with the forming head, a variety of direct feed means, involving nothing but translation motion, are available.

Figure 3:
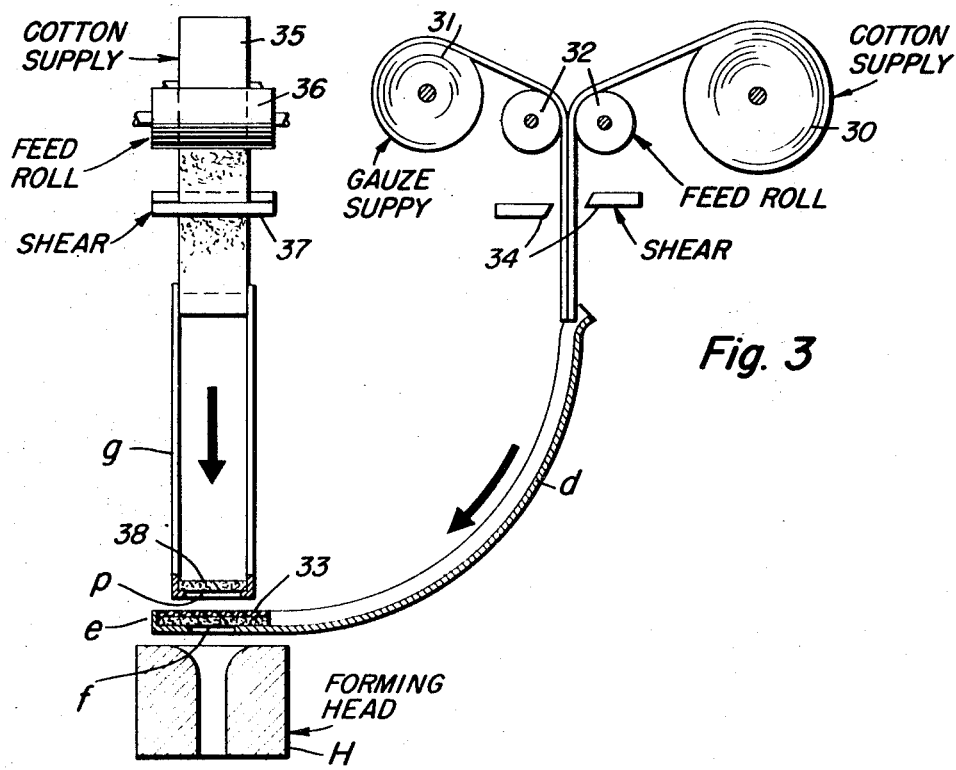

FIG. 3 illustrates one form of feed in which the cotton supply roll 30 and gauze supply roll 31 have their webs brought together and intermittently advanced by feed rolls 32. In all forms of the feed, the feed rolls can be intermittently advanced by a feed cylinder that reciprocates in predetermined phase with a master cam shaft and gives the feed rolls one-way intermittent rotation. Shears 34 cut off end lengths 33, which fall into a short curved chute $d$ that deflects the cut length to its end where a stop $e$ positions it over a ram aperture $f$ above and aligned with the forming head H.

Similarly another cotton supply roll 35 has its web advanced intermittently by feed rolls 36 through shear 37 which cuts off end length 38. These are deflected by chute $g$ like the other except terminating just above the end of the other. The end length 38 comes to rest over an aperture $p$ in the chute $g$ and the cut lengths are thus fed into position ready to be together rammed down into the forming head H.

The gravity feed of FIG. 3 may seem slow, but it will be appreciated that the shear can be phased ahead of the ram as much as desired, so one work piece (or even two or more in succession) may be falling toward the head while the previous work piece is still in process of being rammed in.

Figure 4:
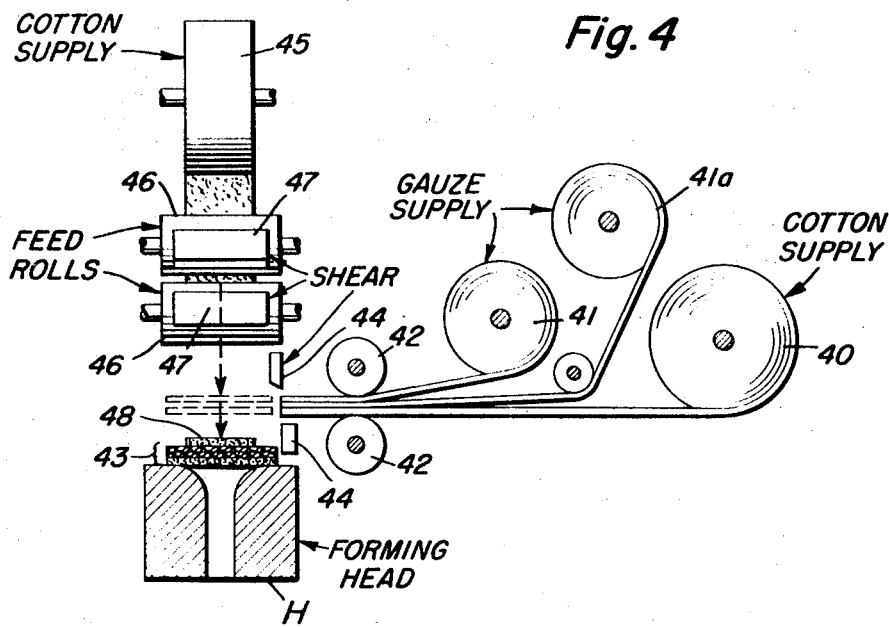

FIG. 4 illustrates a second form of feed, in which the cut pieces drop direct onto the forming head when cut off just above it.

Here the cotton supply roll 40 and gauze supply rolls 41 and 41a have their webs brought together and have them intermittently advanced by feed rolls 42. Shears 44 are located adjacent the forming head H; they cut off end lengths 43 which drop directly onto the forming head.

Similarly another cotton supply roll 45 has its web intermittently advanced by feed rolls 46 through shear 47 which cuts off end lengths 48. These drop directly on top of the other lengths 43, centered on top of the forming head.

FIG. 5 illustrates a third form of feed, in which the cut pieces are pulled across from the shears to the forming head by sliding frame members which may be called carriages.

Here the cotton supply roll 50 and the gauze supply roll 51 have their webs brought together and have them intermittently advanced by feed rolls 52. Shears 54 cut off end lengths 53. These are grasped by fingers $i$ on carriage $j$ which slides along guideway $k$ that extends past the forming head H.

Similarly another cotton supply roll 55 has its web intermittently advanced, by feed rolls 56, through shear 57 which cuts off end lengths 58. These are grasped by fingers $l$ on duplicate carriage $m$ sliding in guideway $n$. This carriage $m$ slides in just above the lower carriage $j$. Both guideways have apertures $o$ which are centered over the forming head. The carriages travel just beyond the forming head to center the work pieces over those apertures so the work pieces can be rammed down thereinto as will be further described later.

A desirable feature which fits in particularly well with this reciprocating carriage type feed is an arrangement for insuring that no half-loaded tampons will be formed. An electric eye $p$ (light beam above, photocell and actuating circuit below) is provided where the cut length 53 will traverse from shear to forming head. It is phased to be sensitive when the cut length is due to be passing through it. When no cotton interrupts the light beam at that phase, the photocell actuates the fingers $l$ on the other carriage to release its work piece and actuates an air blast $q$ there to blow that other work piece out. A reciprocal electric eye $r$ at the second carriage actuates the fingers $i$ and air blast $s$ at the first carriage.

FIG. 6 illustrates another feed arrangement. Here the cotton supply roll 60 and gauze supply roll 61 have their webs brought together and have them advanced by feed rolls 62. The two webs continue along together, being advanced intermittently, or continuously with a loop take-up, as desired. The composite web advances past a station where lengths 68 cut from supply roll 65 by shear 67 fall upon it. The web bearing the spaced second lengths across it advances through shears 64, pushing crossed lengths successively to the center of the forming head. The shears 64 cut the web into lengths 69 each of which carries a length 68.

FIGS. 2 and 7 illustrate the action and apparatus for handling the work pieces after they have been fed in together. In a representative feed arrangement the cut lengths of cotton and gauze 23 will rest on a tray 70 that has an aperture 71 through it, and the other cut length of cotton 28 will rest on a tray 72 that has an aperture 73 through it. The trays have side flanges 74, 75 to position the pieces of cotton. The apertures in the trays are large—of the order of half the area of the cotton pieces— and they are aligned with each other and with the mouth of the forming head.

Above the work pieces there is a telescopic ram, designated generally by reference character 80. It slides in sleeve 81 mounted on the frame of the machine by any desired means. The ram comprises an axially bored outer plunger 82 and an inner plunger 83 located in the axial bore of the outer plunger. The two plungers are independently operable. The inner plunger 83 constitutes a "forming head ram" and is used for pushing the work into the forming head. The outer plunger 82 constitutes an "oven cylinder ram" and is used for forcing the compressed tampon wad on out of the forming head and into a cylinder aligned below it on the oven chain.

The forming head indicated generally as H has an initial gathering action and a subsequent compressing action. Its generally cylindrical bore 90 has a smooth flared mouth 91. When the plunger 83 comes down it pushes down the centers of the work pieces, forces them together, and compels the cotton pieces into conical shell form. Continuing down, the plunger carries them into the flaring mouth of the forming head bore. There the cotton pieces are forced into a tighter conical shape. As the plunger continues down it forces the work pieces into the cylindrical mid-portion of the bore, where the cotton is constrained into cylindrical shape.

The plunger 83 then retracts as the compressor blades start to squeeze in. These compressor blades 92 extend through vertical slots 93 in the wall of the cylindrical bore 90. The slots and blades are arranged radially about the bore, and any desired number, for example six, may be provided. When the plunger 83 has retracted, the compressor blades 92 move radially inward, compressing the tampon wad. These blades are mounted on platen bars 94, which are hinged—as by pilot pins 95—at the bottom of the forming head H. The platen bars are forced to hinge inwardly by the linkage of arms 96 extending out from them and pivotly connected to links 97 at which pull upwardly. Any convenient design of this general nature may be used, so long as it provides a quick and powerful radial compression. The moving in of the compressor blades 92 pursues the cotton wad, forcing it into a solid mass, filling the hollow left by withdrawal of the plunger 83, giving it a somewhat fluted though generally cylindrical configuration. Reference to FIG. 8 will show that the forming head compressor blades remain at their inwardmost compressing position for about 70° of the complete 360° cycle of the machine. Then the compresor blades move back to their retracted position, and the tampon wad can be forced out of the forming head bore.

Now the outer plunger, which constitutes the oven cylinder ram, comes down, engages the cotton wad, and forces it through an inwardly tapered bottom portion 98 of the forming head bore.

The forming head has its bottom plate fitting into, or constituting part of, the roof plate 101 of the oven 100. The bottom tapered portion 98 of the forming head bore extends down somewhat through roof plate 101 into the oven 100. The oven has also end plates 102, 103 and side plates.

Within the oven there is an oven chain 110, which carries a successive series of hollow cylinders 111. These cylinders are mounted close to each other in endless succession with uniform spacing. Oven chain 110 follows a path of the lines on a single plane. To increase the travel time that any given cylinder spends inside the oven, the oven chain is successively doubled back on itself over a series of sprocket wheels 112. As will be further detailed hereafter, the chain after considerable travel time within the oven emerges and passes around other sprocket wheels, including a drive sprocket, and ultimately returns, by a comparatively short path inside the oven, into position under the forming heads.

It will have been noted that there are several transfer operations in the operation of the machine. The feed pieces are transferred from the shears to over the throat of the forming head (unless as in FIG. 4 they are sheared in situ). The compressed wads in the forming heads are transferred into the oven cylinders. The wads are later transferred from the oven cylinders into the tubes which have been placed in cup members standing about the rim of an assembly wheel. The term "transfer" will be applicable to any of these according to context.

The mode of operation of the heads in relation to the oven cylinders, between which the second of these transfers occurs, will now be explained in more detail and the parameters of design of this vital portion of the machine will be set forth.

An underlying concept of this invention is that the complete cycle of a forming head (load, compress, transfer) takes considerably longer than it takes to move the oven chain the distance y from one dwell position to its next dwell position, y being the distance between successive oven cylinders. Therefore one chain can accommodate a plurality of heads. For smooth fast operation the heads should be stationary. The heads are of diameter greater than the dimension y, and may require additional spacing so they are readily accessible for maintenance. This invention provides a plurality of heads in operative locations, such that following this invention any desired number of heads can be provided, with any desired amount of spacing between the heads, and yet they will by following these teachings be located where operative and with the whole having maximum capacity with optimum working conditions.

I first fix certain relationships that help give optimum operation. I make the distance y between all successive oven cylinders on the chain the same. I advance the oven chain in equal successive increments y, with a uniform dwell after each advance, so the intermittent advance is the simplest and most regular possible, has the smallest acceleration and deceleration for a given average velocity, and has minimum power requirements. I arrange that one forming head transfers each time the oven chain has advanced, which gives maximum production for a given chain length. It follows from this that $x=h$, where $x$ is the number of advances of the chain per head cycle, and $h$ is the number of heads. And I operate the forming heads in similar cycles, with the different heads all phased $1/h$ cycle apart, so they operate in a steady smooth succession with the load, noise, vibration, etc. all identical for each $1/h$ cycle.

Now I mount a first forming head $H_1$ at a position over the oven chain, axially lined up with one of the oven cylinders on the chain. All other heads $H_2$, $H_3$ . . . $H_h$, will be similarly mounted over the oven chain, at spacings $ny$ from the first head $H_1$, in which $n$ is any integer from 1 up.

The permitted spacings and the forbidden spacings for the various heads relative to the first head $H_1$ and relative to each other are governed by the following expression:

$$D_{H_\alpha, H_B} \neq (\phi + nh)y$$

in which:

$D_{H_\alpha, H_B}$ is the distance between any two heads;

$\neq$ stands for: does not equal.

$\phi$ is the difference between the order of operating of the two heads that are being compared, in the sequence of the cycle. (For example: $H_1$ is the head that transfers first, and $H_3$ is the head that transfers third; when considering these two heads to determine the distance between them, $\phi = 3-1 = 2$.)

$n$ is any integer from 0 up $h$ is the number of heads $y$ is the distance between successive oven cylinders.

It is to be noted that each head must observe this expression in its spacing relative to each of the other heads.

It is observed that for $h$ heads, when $H_1$ has been located then there are $h-1$ series of locations in which head $H_2$ may be located, each series being made up of locations repeating at intervals of $hy$. Then when a position has been chosen for head $H_2$, there are $h-2$ series of locations left for head $H_3$, each series being made up of locations repeating at intervals of $hy$, etc.

For example, if there are five heads and the first, $H_1$, has been located somewhere, the second may be located at any point on any of four repeating series. Once a location for $H_2$ has been chosen, the head $H_3$ may be located anywhere on three remaining series. Once a location has been chosen for it, head $H_4$ may be located anywhere along either of two remaining series of locations. Then when it is located, head $H_5$ must be located at some one of the locations along the one remaining series.

Operating within this limited degree of freedom at once permits convenient spacing apart and ensures operative relationship with the smoothest, fastest, quietest and least troublesome mode of operation.

In choosing the number of heads to provide, the limit is found by determining (1) the shortest practical dwell time for the transfer operation to take place, adding (2) the shortest practical time for one step of travel of the chain between dwells, and then seeing how many times (1) plus (2) goes into (3) which is the shortest practical time for one complete cycle of the forming head, namely feed, push down into, compress, transfer. It has been established that provision of three heads meets the requirements and gives a significantly greater production rate than an arrangement having two heads, but more than three heads may be used in accordance with this invention.

The formula will be applied for: number of heads ($h$) is 2, oven cylinder spacing ($y$) is 2".

$$D_{H_1, H_2} \neq [(2-1)+n2]2''$$
$$\neq (1+2n)2''$$

The value of this expression is:

if $n=0$, 2"
if $n=1$, 6"
if $n=2$, 10"
if $n=3$, 14"
etc.

Thus the second head $H_2$ can be spaced from the first head $H_1$ by any two-inch intervals except 2", 6", 10", 14", etc. That is to say, it can be located 4", 8", 12", 16", etc. from the first head; any one of these permitted locations may be chosen.

The formula will now be applied for: number of heads ($h$) is 3, oven cylinder spacing ($y$) is 2". This is the presently preferred form, though there can be advantages in having more heads than three. Be it remembered that head $H_2$ is the second one to transfer, regardless of where it is located, and $H_3$ is the third head to transfer, regardless of where it is located.

$$D_{H_1,H_2} \neq (\phi=nh)y$$
$$\neq [(2-1) \neq n3]2''$$
$$\neq (1+3n)2''$$

The value of this expression is:

if $n=0$, 2"
if $n=1$, 8"
if $n=2$, 14"
if $n=3$, 20"
etc.

That leaves the following permitted locations for head $H_2$ in terms of inches away from head $H_1$, 4, 6, 10, 12, 16, 18, etc.

Now any one of those locations is chosen, at will, for head $H_2$.

Now we consider head $H_3$, which is the third one of three to transfer. It must not be any of certain distances from head $H_1$ and it must not be any of certain distances from head $H_2$.

$$D_{H_1,H_3} \neq (\phi=nh)y$$
$$\neq [(3-1)+n3]2''$$
$$\neq (2+3n)2''$$

The value of this expression is:

if $n=0$, 4"
if $n=1$, 10"
if $n=2$, 16"
if $n=3$, 22'
etc.

Therefore we cannot locate $H_3$, 4" or 10" or 16" or 22" etc. from head $H_1$.

Where can we not locate it with respect to head $H_2$?

$$D_{H_2,H_3} \neq (\phi=nh)y$$
$$\neq [(3-2)+3n]2''$$
$$\neq (1+3n)2''$$

The value of this expression is:

if $n=0$, 2"
if $n=1$, 8"
if $n=2$, 14"
if $n=3$, 20"

Now we compare the relations between heads $H_1$, $H_2$ and $H_3$ and find that if we elected to locate $H_2$ at 4" from $H_1$ we cannot locate $H_3$ at 2", 8", 14", 20", etc. from $H_2$ (because that $H_2$, $H_3$ spacing is forbidden) nor at 6", 12", 18", 24", etc. from $H_2$ because the 4", $H_1$, $H_2$ distance added to this series would put $H_1$, $H_3$ in its forbidden series.

Similarly if we pick any permitted $H_1$, $H_2$ distance we can note which series of locations for $H_3$ does not violate the $H_2$, $H_3$ prohibition nor the $H_1$, $H_3$ prohibition.

In the very simple cases of 1, 2 or perhaps 3 heads the formula appears cumbersome. Even in the case of 3 heads it shows up degrees of freedom within the essential limits that might otherwise be missed. In the case of a larger number of heads it will identify with precision what can be done and what cannot be done, and the exact range of permitted vs. forbidden choices that may not otherwise be apparent.

In the embodiment of the invention here illustrated there are three forming heads. They are arranged in straight lines, corresponding to the straight line which the oven chain travels under them. The spacing of the three forming heads is critically related to the spacing of the successive cylinders in the oven chain and to the number of forming heads. This is perhaps best illustrated in FIG. 8. The successive phase of operation of the ram, along with the various associated operation, can be simplified into three primary phases: first the inner plunger pushes the work pieces into the forming head; then the blades compress the cotton within the forming head; then the outer plunger rams the compressed wad out of the forming head and into the oven cylinder below it. These three primary phases are repeated endlessly. The phases of the three heads as shown at the top of FIG. 8 correspond to the phases for those three heads as indicated by the heavy vertical line at 60° in the time chart of the lower part of FIG. 8. In the upper left portion of FIG. 8, the forming head has finished the transfer ramming 120° ago, so the cylinder below it has taken one step to the right and is filled with a wad. Now the plunger is pushing the cotton into the forming head. The cylinder which is now below the forming head A will not receive this wad, because the oven chain will have taken two steps to the right before this particular wad is transferred; at that time a cylinder labeled $a$ will be below this forming head to receive this wad.

At forming head B we are in phase 2 at the moment which is depicted in the upper portion of FIG. 8. The cotton pieces that were 120° ago forced into this head are now being compressed between compresser blades. The cylinder on the oven chain which is below the bore of head B right now will not receive this wad, because the chain will have stepped along one unit of spacing of the successive cylinders by the time this wad is to be transferred by the ram. Thus the cylinder now one unit to the left, labeled b, is destined to receive this wad.

The forming head C we find now operating in phase 3. The oven chain has brought an empty cylinder under this forming head, and the ram is just ending the act of forcing the wad out of the forming head into a cylinder. As the eye travels from right to left it notes that at the right end all of the cylinders are filled with tampon wads. As we travel left from forming head C, we find every third cylinder to be vacant. As we travel left from forming head B we find two out of every three cylinders vacant. And of course as we travel left from head A we find all of the cylinders vacant.

A factor in this design situation is that the entire oven chain—which with its cylinders has considerable mass—must be accelerated from rest, traveled its unit distance, and then be decelerated to rest again, for every time that any one of the forming heads transfers a tampon wad. That is to say, with three forming heads, three times for each complete cycle of the machine. Another factor is that it is highly desirable to have this intermittent accelerating and decelerating of the oven chain occur regularly in uniform steps, to avoid problems or vibration, noise, power requirements, and breakdown. The closer the cylinders on the oven chain are to each other, the shorter the distance to be traveled, and the less the acceleration and deceleration and power requirement for any given number of advances per minute. Thus, the cylinders are located at short distances from each other. However, the forming heads must be comparatively large.

The forming heads are spaced from each other within the following restrictive conditions:

The second head must be spaced at least one head-length from the first, so they can both fit in place.

The third head must fill the above conditions relative to the first head and also relative to the second head. If there be $h$ heads, each head must have fulfilled these conditions relative to all the other heads.

The timing cycle for the main moving components of the head and of the machine is illustrated in detail in FIG. 8. Since this information is fully contained in the drawing, it will not be repeated here. It will be observed in that drawing that the three heads, A, B, and C, have identical cycles which are offset 120° between the three. It will be observed that the oven cylinder chain moves in a regular pattern repeated identically every 120°, and that the oven cylinder chain is stationary at each of the three phases that are illustrated for the three heads.

The tampon wads travel back and forth through the oven for a long enough time to set up and assume the size and shape that they will retain, being exposed to dry heat while kept under compression. They then travel out of the oven as the oven chain goes out and over the sprocket wheels on their way to a stringer.

Just before coming to the stringer, they are subjected to an electric eye whose beam passes through the cylinder if it be empty. If the absence of a tampon load is detected, a relay deactuates the stringer when that cylinder comes to stringing position.

The stringer itself is already known in the art, so is merely indicated in the drawings by block diagram.

Each oven cylinder 111, FIG. 7, has a pair of open-end slots 113 and 114 extending up from the bottom, the two being diametrically opposite each other. As each cylinder comes opposite the stringer, a needle goes through the slots and through the bottom end part of the tampon, leading a string through and then knotting or looping it.

The oven chain then continues on in a straight line to the next sprocket wheel which it is strung around. In that straight line run, it passes adjacent an assembly wheel 120, one edge portion of which lies just beneath the oven chain. This assembly wheel will insert the stringed tampon wads into telescoping tubes which serve as packaging and applicator.

Figure 9:
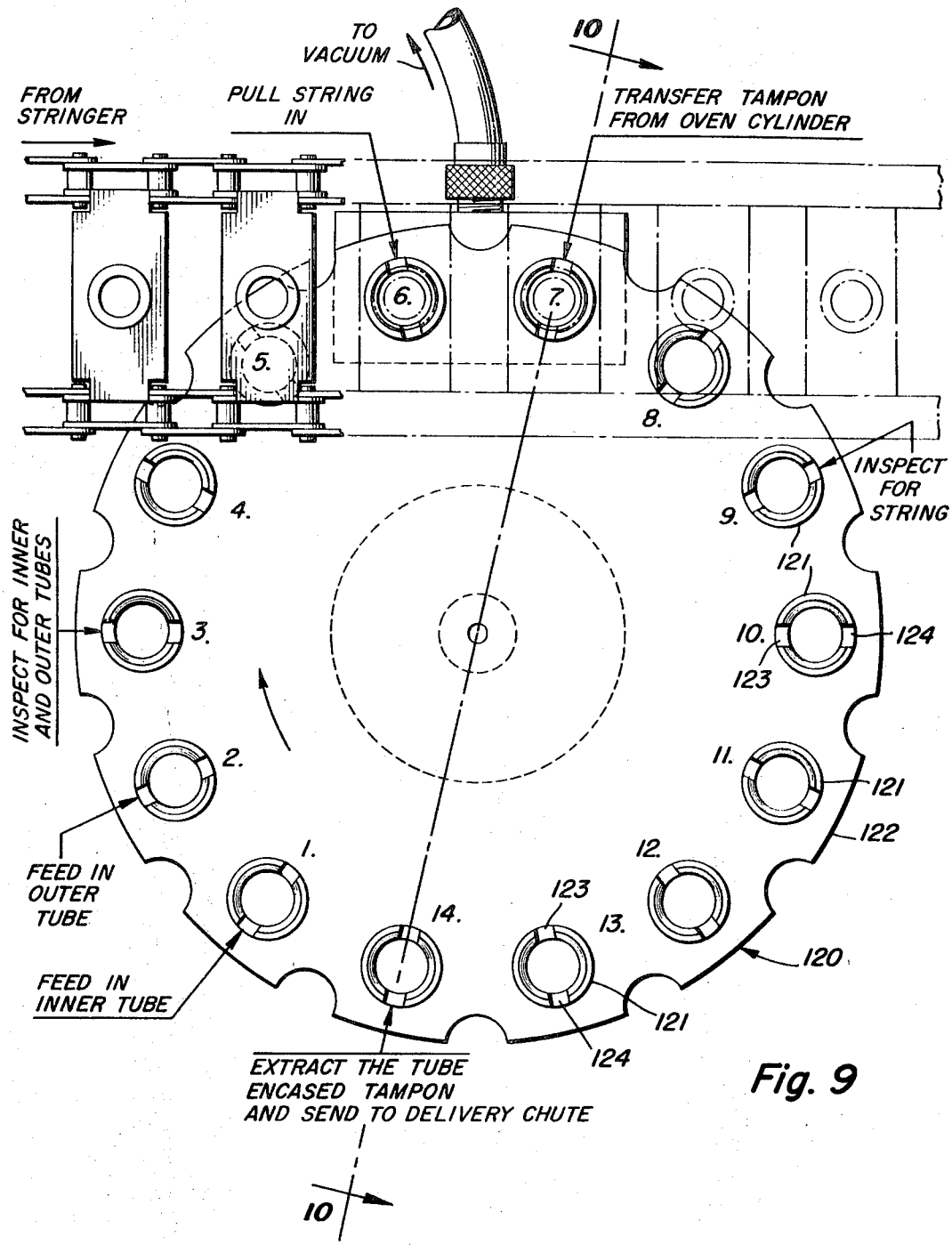
FIG. 9 is a top plan semi-diagrammatic view of the assembly wheel and cooperating stations of the cylinder chain.

The assembly wheel has 14 stations in the form shown in FIGS. 9 and 10. These stations are arranged at equal distances from the center of the assembly wheel and are equally spaced from each other. The spacing between them, as measured in a straight line from center to center, is essentially the same as the center-to-center spacing of the cylinders on the oven chain.

For convenience of discussion, these stations will be numbered 1 to 14. Physically, each station on the assembly wheel has an upstanding cup 121 secured to the bottom plate 122 of the assembly wheel. These cups are mounted in bores that extend through the bottom plate of the assembly wheel. The cup is hollow inside. Its bottom end is open, and it has there a first diameter. Just above this, it enlarges slightly to a second diameter. Then about half way up it slightly enlarges again to a third diameter. It is open-mouthed at the top, has an inside bevel, so it flares slightly there. Each cup has two diametrically opposite slots 123 and 124 in its side walls that extend below mid height up to the top where they are open ended.

The tampon is to be here inserted into two telescoping tubes of cardboard on the right, as seen at the left in FIG. 10. The inner telescoping tube 125 is of just sufficiently less diameter than the outer tube 126 so that they stay together but can be telescoped.

At station 1, the inner tube 125 is dropped into the cup 121 by any suitable feeding means. It falls to the lower internal shoulder in the cup, which supports it.

At station 2, some suitable means feeds in the outer tube 126. It slides down over the top end of the inner tube, and comes to rest on the upper internal shoulder of the hollow bottom of the cup.

At station 6, the cup has come into registry with an oven cylinder on the oven chain above it. At this station, a vacuum source which has an opening just below and registered with the bottom through the cup, is actuated. The pull of air from around the top of the cup down through it gathers in the string hanging from the tampon wad in the oven cylinder above, and pulls it down through the hollow cylinders of the telescoped cardboard tubes in the cup. As the assembly wheel travels in its arc from station 6 to station 7, and the oven chain travels in a straight line from station 6 to station 7, the cup and the cylinder will go slightly out of register and then return into register. That slight intermediate deviation does no harm because the string is hanging loosely down from the cylinder through the cup.

At station 7, the cup is precisely in registry with the oven chain cylinder. At this location an oven cylinder ejector 130 (FIG. 1) in the nature of a plunger 131 slideably mounted in a sleeve 132, comes down on the tampon wad and pushes it out of the oven cylinder 111 and down into the larger of the two telescoped tubes. It comes to rest projecting slightly from that larger tube at its top and, with an essentially flat, blunt end flaring out very slightly ever the top end of the tube, FIG. 10. The round bottom end, where the string 127 is affixed, comes to rest against the slightly flared-in top end of the inner tube. In this relationship, the telescoping tubes serve as a convenient applicator, as is known in the art.

At some station prior to station 1, here shown as station 14, the tampon is extracted from the assembly wheel. FIG. 10 illustrates the extractor somewhat diagrammatically. It comprises a pair of arms 140 and 141 each carrying a pin 142. These pins are pointed in toward each other and extend through the side wall slots 123 and 124 of the assembly wheel cup to engage the tampon tube when it is desired to lift the tampon out of the cup. A suitable mechanism moves the pins in toward each other to engage the tampon tube, raises them to lift the tampon out of the cup, and brings them back to wait in spread-apart configuration for the arrival of the next cup and the repetition of their cycle.

The various stations described above have been positioned for convenience of illustration but in practice can be positioned at other suitable locations.

While I have shown and described a preferred embodiment of my application, it will be appreciated that it is somewhat diagrammatic and not to scale, and that many departures and variations may be made within the spirit of the disclosure and the fair scope of the claims.

I claim:

1. A tampon machine having an endless linear chain of cylinders, all successive cylinders being uniformly spaced apart by one unit distance, a plurality of forming heads mounted along the line of said chain at spaced intervals which are integral multiples of the unit distance, first means associated with each forming head for feeding work pieces into its respective forming head, second means for transferring tampon wads from the forming heads to the cylinders, assembly stations on an assembly wheel at successive stations which are spaced apart by that same unit distance, means for advancing the chain intermittently by one unit cylinder-spacing distance at a time to thereby produce a dwell after each advance, and third means for transferring tampon wads from a cylinder to an assembly wheel station during each dwell.

2. A tampon-making machine having an endless chain of uniformly spaced cylinders spaced apart by one unit distance;

means to advance said chain intermittently one cylinder-spacing unit at a time to produce a dwell after each advance, a plurality of forming heads aligned with a plurality of cylinders at each dwell for forming tampon wads from work pieces, first means associated with each forming head for feeding work pieces into its respective head;

second means for transferring tampon wads from said forming heads to said cylinders at a dwell; and an assembly wheel having a plurality of transfer cups preselectively positioned with respect to said chain to align a plurality of transfer cups with a plurality of cylinders at each dwell, and means for transferring a tampon wad from a cylinder to a transfer cup at each dwell.

3. The tampon-making machine of claim 2 in which said transfer cups of said assembly wheel are arranged in a ring, said cups being equally spaced from the center of said ring with successive cups equally spaced from one another by a straight line chordal distance equal to said one unit distance.

References Cited

UNITED STATES PATENTS

| 2,425,004 | 8/1947 | Rabell | 19—144.5 |
| 2,714,230 | 8/1955 | Young | 19—144.5 |
| 2,798,260 | 7/1957 | Niepmann et al. | 19—144.5 |
| 2,931,075 | 4/1960 | Hobbins | 19—144.5 |
| 2,976,579 | 3/1961 | Rabell | 19—144.5 |

DORSEY NEWTON, Primary Examiner